Feb. 1, 1944.    A. E. TRAVER ET AL    2,340,714
METHOD AND APPARATUS FOR SOUND ANALYSIS
Filed Jan. 4, 1941    2 Sheets-Sheet 1

ALFRED E. TRAVER
CARL E. HABERMANN
INVENTORS

BY
ATTORNEY

KNOCK MEASUREMENT PRINCIPLE

TYPICAL KNOCKMETER CURVES
UNKNOWN AND REFERENCE FUELS.
1939 OLDSMOBILE

ALFRED E. TRAVER
CARL E. HABERMANN
INVENTORS

Patented Feb. 1, 1944

2,340,714

UNITED STATES PATENT OFFICE 2,340,714

METHOD AND APPARATUS FOR SOUND ANALYSIS

Alfred E. Traver, Brooklyn, and Carl E. Habermann, Great Neck, N. Y., assignors to Socony-Vacuum Oil Company, Incorporated, New York, N. Y., a corporation of New York Application January 4, 1941, Serial No. 373,070

4 Claims. (Cl. 73—51)

This invention is directed to devices for detecting, measuring, and comparing knocks or detonations arising from combustion of fuels in internal combustion engines.

The problem of determining the loudness of detonation or knock in internal combustion engines, and gasoline engines in particular, is well known and many devices and methods have been described in the trade and technical journals on this subject. One method of testing gasoline is to operate an automobile under detonating or knocking conditions and to determine the relative knock intensity of various fuels by ear or other device. In general, these devices may be divided into two classifications; first, those which aid the ear to determine the loudness of the sound, and second, those which indicate the loudness of the sound on electrical meters without use of the human ear.

The human ear varies in sensitivity to sound for different individuals and the keenness of hearing of one individual will vary constantly throughout the day, since the organs which are used in hearing tend to become tired with use and their sensitivity temporarily lowered. Therefore, any device or method for determining the loudness of detonation which uses the human ear is unsatisfactory.

The devices which have been built to indicate the loudness of detonation on meters consist essentially of two types; first, the sound level meter, and second, the sound analyser. These instruments cannot be used successfully for the followin reason:

The sound of detonation occurs for a very short interval of time and usually reoccurs at constant intervals. The time of duration of the loud sound of knock may only be one percent or less of the duration of time between the reoccurring detonation sounds. Therefore, it is very difficult to determine the sound intensity on meters which tend to measure the average sound intensity throughout the engine cycle.

The object of this invention is to provide a detonation meter incapable of reflecting variations in mechanical setups and operator responses. A further object is the provision of a meter capable of being adjusted for reception and measurement of knock, accompanied by the suppression of extraneous engine noise.

Figure 1:
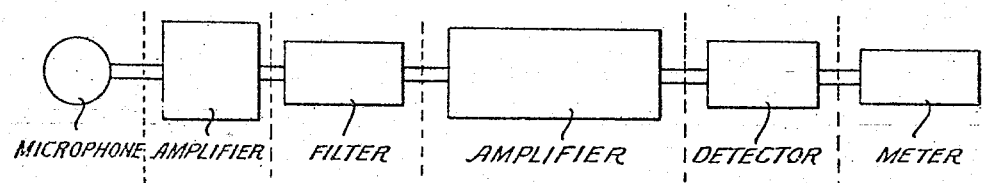
Figure 2:
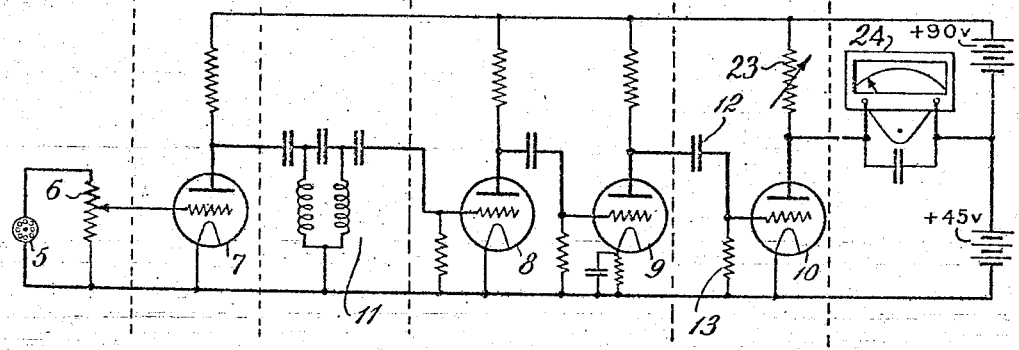
Figure 3:
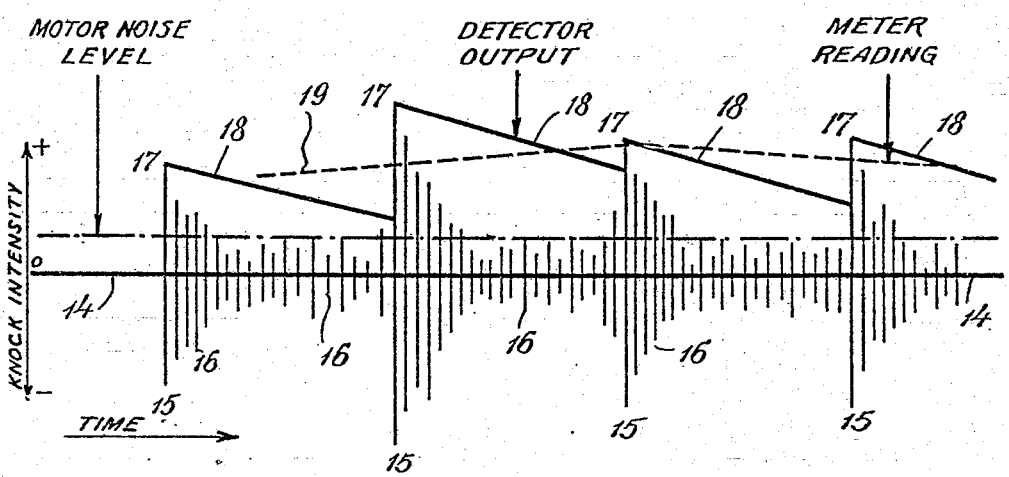
Figure 4:
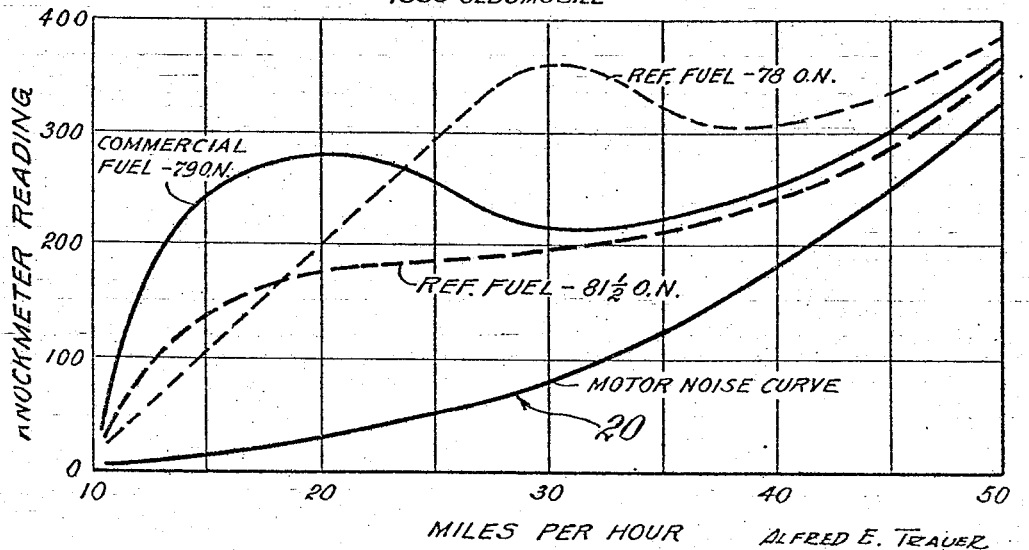

All of these objects, as well as others which are hereinafter indicated, flow from the particular character of this novel meter, where characteristics may be understood by reference to the drawings attached hereto. In these drawings Figures 1 and 2 shows in schematic form the wiring setup of the meter. Figure 3 shows in principle the method of knock measurement, and Figure 4 shows a sample result sheet arising from the use of the meter.

The knock comparator consists of the following essential parts. A microphone, vacuum tube amplifiers, filters, vacuum tube detector, and an indicating meter. All of the parts, with the exception of the microphone, are built into a portable metal case which also contains the batteries necessary for its operation.

The sound of the knock and other noises are picked up by a microphone, Figure 2, item 5, sensitive to sound frequencies from 40 to 10,000 cycles per second. The microphone converts the sounds to equivalent electrical waves. The electrical waves are passed through an attenuator 6, and through three amplifying stages, 7, 8, 9, before being impressed on the grid of the vacuum tube detector, 10. There is a band pass filter 11, interposed between the first and second vacuum tube amplifier stages and a similar filter is preferably inserted between the second and third stages. The filters are of the tuned inductance-capacity type and the coupling between the amplifiers is of the conventional resistance-capacity type.

The filters are not sharply tuned, for it was desired to obtain a broad band of sound frequency which would pass the filters. In case of operation with a single type of motor, the filters may be fixed at a preselected level, say approximately 4000 cycles; however, for most uses it is desirable to use variable frequency filters, in order that the meter may be adjusted for use with various motors in which knocking occurs at various frequencies, ranging usually between 2000 and 6000 cycles per second. The frequency of the filter to be used may be determined by experiment and will vary with different automobiles. The filter should be set to pass a frequency band which will give the best discrimination between the sound of the knock and of other engine noises.

The detector circuit consists of a coupling condenser 12 and a vacuum tube grid leak 13 of such values of capacity and resistance that the effect of an electrical wave of high intensity will be maintained for a period of time many times longer than its own duration. In this application it is desirable to make the time constant of the condenser-resistor combination somewhat longer than the expected interval between the successive detonations.

The effect of this method of handling the detector tube may be seen by reference to Figure 3. In this figure, 14—14, is a time axis. Vertical lines 15, 15, 16, 16, etc., indicate the occurrence of sounds along this time axis, and their length vertically indicates their relative strength. Lines 15, 15, indicate the strong sounds arising from knocking. Lines 16, 16, indicate other sounds arising from general motor noise. Remembering that the filter system has removed engine noises of frequencies other than those of the sounds of knocking, it will be realized that those few engine noises of frequencies such that they pass the filter are relatively quite unlikely to be of intensity or strength comparable to the sound of knocking. In electrical terms, the height of any line 15 (or 16) is the voltage impressed upon the condenser 12 in the detector circuit. Thus that condenser is charged to successive levels 17, 17, etc., and the charge drains therefrom at a substantially constant rate determined by grid leak 13, giving outputs of substantially constant rate of decrease, as shown by lines 18, in Figure 3. Now, if no sound 16 is of sufficient intensity to rise above the level of line 18 at the instant of arrival of sound 16, then the extraneous sound will have only a slight effect on the output of the detector. The meter reading, as indicated by line 19, is a further damped summation of the detector output, proportional thereto, but without the momentary variations existing in detector output.

What this operation amounts to in simpler terms is this. First the microphone converts all engine noise including knock into electrical impulses. Next we discard electrical impulses corresponding to sounds having frequencies other than the frequency observed for the sounds of knocking. Next we discard impulses corresponding to sounds having the same frequency as knock sounds and occurring in time intervals immediately following the knock sounds. What is left consists of a mixture of electrical frequencies of two amplitudes; a background of low amplitude impulses, corresponding to the miscellaneous small noises of the same frequency as knock sounds but not related thereto, which is designated as the engine noise level, and high amplitude impulses corresponding to the knock sounds, the average intensity of which may be measured and spoken of as engine knock.

The meter circuit has been designed so that a decrease in current through the detector tube, which will be caused by an increase in knock intensity, will be indicated as an increase in meter reading. A manually controlled variable resistor 23 is used in the plate circuit of the detector tube so that the meter 24 may be set to zero at any level of sound intensity.

In actual service the microphone is placed in the engine compartment of an automobile by some suspension relatively incapable of mechanically transmitting engine vibration to the microphone, and is connected to the meter box by means of a shielded cable. The meter box is placed in a position convenient to the observer.

The automobile is operated in normal manner with a fuel non-knocking under normal conditions of operation, to determine the noise level incident upon such operation; which may be expressed, if desired by a curve such as curve 20 in Figure 4. If investigations of knocking at a single speed are to be made, only the noise level at that speed need be determined, but in the usual case, knocking over an acceleration range is investigated. Then the auto is operated under knocking conditions and the meter 24 adjusted to give center scale reading at the conditions of knock encountered. These operations, conducted together, and preferably in reverse order to that given, serve to adjust the meter 24 to the motor with which it is to be used in the test contemplated.

This invention is superior to the prior art in several ways. First, it does not depend upon the human ear. Second, the meter reading depends upon the loudest sound reaching the detector circuit and not upon the average sound level. Third, sounds which are not caused by the knock tend to be eliminated from the meter reading by electrical wave filters. Fourth, the meter 24 is well damped so that the eye can follow the indication of knock intensity. Fifth, the device is in a portable form and suitable for use on automobiles on the road.

We claim:

1. That method of investigating the knocking characteristics of an internal combustion engine fuel, comprising burning the fuel in an engine under knocking conditions, observing all of the sounds emanating from said engine with a microphone capable of converting sound to electrical impulses, passing all of said impulses through an electrical filtering system to eliminate therefrom sounds of frequencies different from the frequency of the knock sounds, passing the remaining impulses through an electrical system having a time-lag feature acting to substantially eliminate impulses of the same frequency occurring at time intervals differing from the time interval of the knock sounds, and measuring the relative strength of the remaining impulses as a measure of the knocking intensity of the fuel under examination.

2. That method of analyzing a sound complex including sounds of varying frequencies, a particular recurring sound which it is desired to investigate and other sounds recurring at intervals different from the particular recurring sound and which may have a frequency similar to the particular sound, comprising converting the sound complex to a complex of electrical impulses, filtering out impulses corresponding to sounds of frequencies different from the particular sound, filtering out impulses of desired frequency but occurring at time intervals differing from the recurring particular sound, by generating in a triode an output current whose value is substantially proportional to the intensity of each recurring particular sound and substantially constantly diminishing said output current between each recurrence of said particular sound at a rate so selected as to prevent substantial changes in triode output current caused by sounds of like frequency and lesser intensity occurring between said recurring particular sounds, and observing the value of said triode output current as a measure of the characteristics of the recurring particular sound.

3. In an apparatus for investigating the knocking characteristics of an internal combustion engine fuel, having means capable of converting sounds into electrical impulses for detecting all of the sounds emanating from said engine when said engine is in operation, means connected to said detecting means for amplifying said electrical impulses, a filter connected to the output of said amplifying means adapted to pass sounds of selected frequencies, additional amplifying means connected to the output of said filter means for amplifying the signals of selected frequencies, electronic detector means for detecting said amplified signals, and means connected to the output of said detector means for indicating said detected signals, the improvement that comprises common means in the in-put circuit of said detector means for coupling said detector means to said amplifying means and for maintaining a wave of high intensity for a pre-determined period of time that is longer than its own duration, said means comprising a condenser and grid leak, the values of which bear a ratio to each other such that the condenser will have a pre-determined time discharge constant in order that the duration of the high intensity signal can be maintained a controlled period of time.

4. In an apparatus for investigating the knocking characteristics of an internal combustion engine fuel, having means capable of converting sounds into electrical impulses for detecting all of the sounds emanating from said engine when said engine is in operation, means connected to said detecting means for amplifying said electrical impulses, a filter connected to the output of said amplifying means adapted to pass sounds of selected frequencies, additional amplifying means connected to the output of said filter means for amplifying the signals of selected frequencies, electronic detector means for detecting said amplified signals, and means connected to the out-put of said detector means for indicating said detected signals, the improvement that comprises common means in the input circuit of said detector means for coupling said detector means to said last amplifying means and for maintaining a wave of high intensity for a pre-determined period of time that is longer than its own duration, said means comprising a condenser and grid leak, the values of which bear a ratio to each other such that the condenser will have a pre-determined time discharge constant in order that the duration of the high intensity signal can be maintained a controlled period of time, and means for adjusting said indicating means to eliminate from the detected values signals corresponding to undesired background motor noises.

ALFRED E. TRAVER.
CARL E. HABERMANN.